United States Patent [19]

Nichols et al.

[11] 4,339,810

[45] Jul. 13, 1982

[54] METHOD OF COMPENSATING SEISMIC DATA FOR EFFECTS OF FREQUENCY DEPENDENT ATTENUATION

[76] Inventors: James F. Nichols, 3282 Hunters Glen Dr., Missouri City, Tex. 77459; Peter P. Van Bemmel, 2535 Teague, Houston, Tex. 77080

[21] Appl. No.: 149,438

[22] Filed: May 13, 1980

[51] Int. Cl.³ .............................................. G01V 1/37
[52] U.S. Cl. ...................................... 367/49; 367/41; 367/46; 367/47; 367/65
[58] Field of Search ........................ 367/41, 42, 47, 45, 367/46, 49, 65, 66; 343/5 SA; 364/421

[56] References Cited

U.S. PATENT DOCUMENTS

| | | | |
|---|---|---|---|
| 2,808,577 | 10/1957 | Crawford et al. | 367/41 |
| 3,582,873 | 6/1971 | George, Jr. | 367/65 |
| 3,716,829 | 2/1973 | Ruehle | 367/49 |

Primary Examiner—Howard A. Birmiel
Attorney, Agent, or Firm—Darryl M. Springs

[57] ABSTRACT

In one exemplar embodiment, an improved method is provided for compensating received propagated seismic signals for the absorption by the earth of all frequencies of a vibrator source signal. The received seismic data is crosscorrelated with the original source signal and a Fourier amplitude spectral analysis obtained. Then an attenuation function is determined by the attenuation exhibited by the spectrum. The quantified attenuation function is then applied as a compensation function to the original source signal to obtain a "weighted" vibrator sweep signal that is then used in crosscorrelating with the received seismic data to compensate for the frequency dependent attenuation in the earth of received propagated seismic data.

11 Claims, 13 Drawing Figures

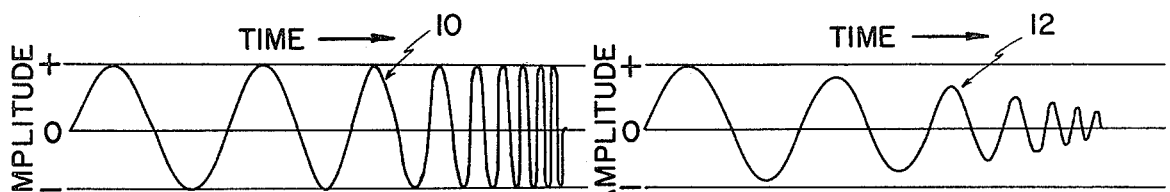
FIGURE 1
FIGURE 2
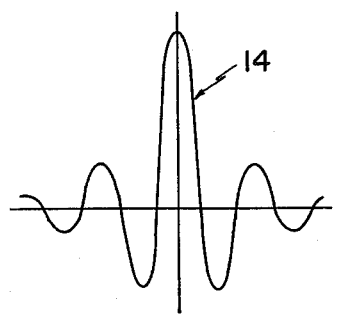
FIGURE 3
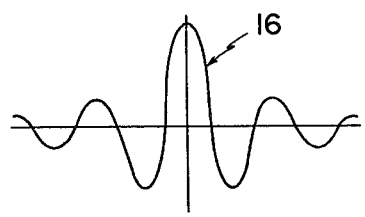
FIGURE 4
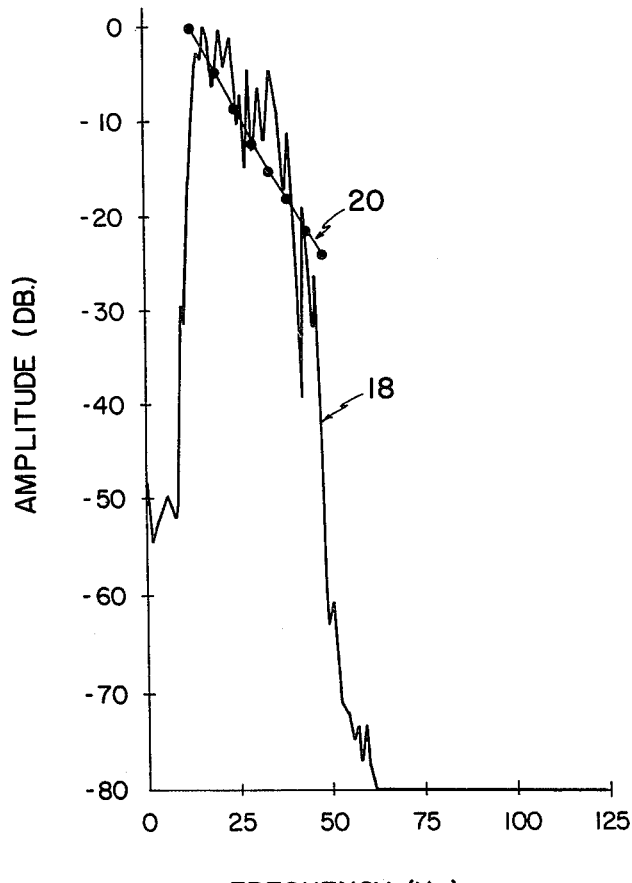
FIGURE 5

METHOD OF COMPENSATING SEISMIC DATA FOR EFFECTS OF FREQUENCY DEPENDENT ATTENUATION

BACKGROUND OF THE INVENTION

This invention relates to the processing of seismic data and is particularly directed to the compensation of seismic data for the frequency dependent attenuation by the earth of propagated acoustic signals.

In utilizing the Vibroseis (a trademark of Continental Oil Company) seismic process, a seismic source signal is generated comprising an oscillatory, multi-frequency signal having predetermined starting and ending frequencies which are nonrepetitive over a preselected time period, and which is substantially longer than the travel time of such a signal as it is reflected from a subsurface geological strata to a seismic receiver on the earth's surface, such a signal to be hereinafter referred to as a "sweep" signal generated by a "vibrator source." Such a process is disclosed in U.S. Pat. Nos. 2,688,124 (Doty et al) and 2,989,726 (Crawford et al), and utilizes an oscillatory "sweep" signal as disclosed therein and which basic disclosure is incorporated by reference herein. As further used herein, the sweep signal generated by the vibrator source and coupled for transmission into the earth will be referred to as the "transmitted sweep" signal, and the sweep signal recorded as a counterpart to the transmitted sweep signal will be referred to as the "recorded sweep" signal.

The frequency dependent absorption of compressional waves in the earth is a known phenomenon quantitatively exhibited on seismic data obtained when making a Vibroseis survey. One method of correcting such data for the high frequency attenuation effects exhibited is disclosed in U.S. Pat. No. 2,808,577 (Crawford et al). The method disclosed therein is directed to a process for altering the effect of at least a portion of either the source "sweep" signal or the recorded propagated data signal upon the correlation values of such signals to counteract the effects on the correlation values which are due to the unequal attenuation by the propagating medium (the earth) of the high frequency components of the transmitted source signal. However, there is no disclosure or even suggestion of a technique for determination of accurate quantitative values of attenuation over the seismic source signal bandwidth nor how to quantitatively compensate for such attenuation.

Prior laboratory studies indicate frequency dependent absorption that is approximately linear at frequencies of 100 Hz and above. Hamilton, E. L., *Compressional Wave Attenuation in Maritime Sediments*, GEOPHYSICS, Vol. 37, pp. 620–646 (1972). Extrapolation to seismic bandwidth is uncertain but could be reasonably expected. Attewell, P. B., and Ramana, Y. V., *Wave Attenuation and Internal Friction as Functions of Frequency in Rocks*, GEOPHYSICS, Vol. 31, pp. 1049–1056 (1966). However, such studies have only measured or predicted the attenuation of compressional waves in certain sedimentary rocks, and such studies have not suggested any technique for accurately determining the attenuation function of received seismic data obtained as a result of using a Vibroseis sweep signal over the sweep signal bandwidth, nor any technique to quantitatively weight a Vibroseis sweep signal prior to correlation to compensate for such attenuation by the propagating medium.

Accordingly, one primary feature of the present invention is to provide a process for accurately determining the frequency dependent attenuation function exhibited by seismic data over the entire frequency range of the vibrator source signal.

Another feature of the present invention is to provide a process for accurately and quantitatively determining the compensation function to be applied to the source sweep signal prior to correlation with the received propagated data signals in order to compensate for the attenuation by the propagating medium.

Yet another feature of the present invention is to determine the discrete times for applying the derived compensation function to the source sweep correlation signal.

SUMMARY OF THE INVENTION

The present invention remedies the problems of the prior art by providing a quantitative process for compensating received propagated seismic signals for frequency dependent absorption by the earth. In accordance with one principle of this invention, a process for quantitative compensation of received propagated seismic signals for the absorption effect of the earth is disclosed wherein such signals have been generated by a vibrator source. The process comprises the steps of producing correlated data obtained by crosscorrelating the received propagated seismic signals with a recorded sweep signal; determining a Fourier amplitude spectrum for the correlated data; establishing a quantitative attenuation function from the Fourier amplitude spectrum for all frequencies contained in the recorded sweep signal; converting the attenuation function to an inverse amplitude function for compensation of the attenuation for all frequencies contained in the recorded sweep signal; applying the inverse amplitude function to the recorded sweep signal to obtain a weighted sweep signal for use in correlation; and producing attenuation compensated correlated data obtained by crosscorrelating the received propagated seismic signals with the weighted sweep signal.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the drawings:

FIG. 1 is a schematic representation of a conventional transmitted sweep signal generated by a mechanical vibrator source;

FIG. 2 is a schematic representation of the sweep signal shown in FIG. 1 which has been propagated through an attenuating geological medium which has increasingly attenuated the higher frequency components of the signal;

FIG. 3 is a schematic representation of an ideal correlation curve obtained when using a sweep signal as shown in FIG. 1 when there has been no attenuation on received seismic data by the geological medium;

FIG. 4 is a schematic representation of a correlation curve obtained when using a sweep signal as shown in FIG. 1 when there has been attenuation on received seismic data by the geological medium as shown in FIG. 2;

FIG. 5 is a representative example of a Fourier amplitude spectrum of received seismic data obtained using a transmitted sweep signal as shown in FIG. 1 which has been increasingly attenuated by the propagating geological medium at the higher frequencies as shown in FIG. 2 and correlated with the recorded sweep signal of FIG. 1, and includes a curve fitted to the average attenuation function exhibited by the data.

DETAILED DESCRIPTION OF THE PREFERRED EMBODIMENTS

Figure 6:
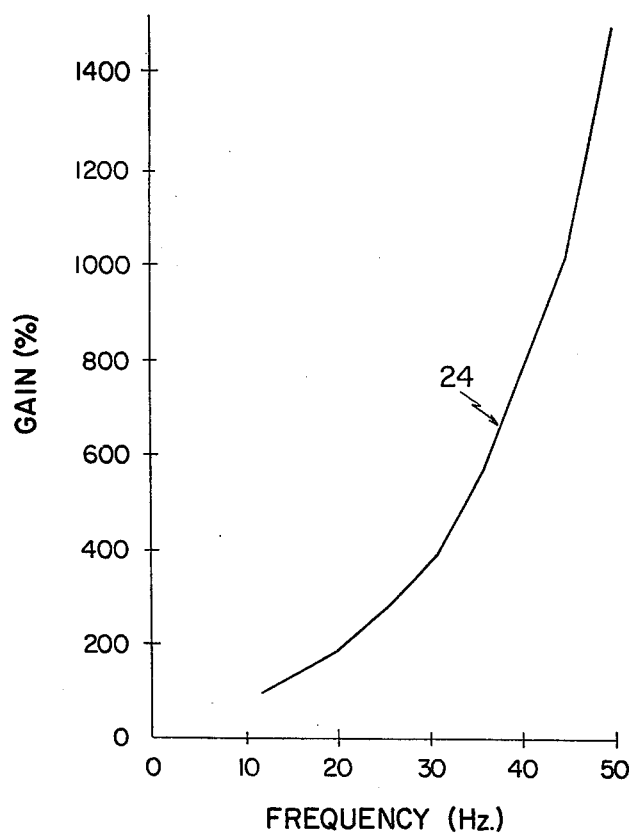
FIG. 6 is an inverse amplitude (gain) function calculated for the attenuation function shown in FIG. 5.

The present invention is a process for quantitatively compensating received propagated seismic signals for the frequency dependent absorption of the transmitted sweep signal when using a vibrator source signal as hereinabove described. Such a source or transmitted sweep signal is shown schematically in FIG. 1 as signal 10 and comprises an oscillatory, multifrequency source signal having predetermined starting and ending frequencies (generally in the range of 10–80 Hz) which are non-repetitive over a preselected time period (generally 15–20 seconds). However, in seismic surveying utilizing such a vibrator source signal, it is known that such compressional waves will exhibit an absorption phenomena in the earth that varies increasingly with frequency as shown in FIG. 2 at 12.

The correlation curve 14 illustrated in FIG. 3 is the theoretical curve derived by the correlation of a transmitted and recorded sweep signal, such as that shown at 10 in FIG. 1, with the same recorded signal after propagation through an ideal medium in which there is no attenuation. Thus, it is truly the autocorrelation curve of the transmitted sweep signal. The correlation curve 16 shown in FIG. 4 is the curve derived by the correlation of the transmitted and recorded sweep signal shown at 10 in FIG. 1, when the propagated signal has been increasingly attenuated at higher frequencies by the propagating medium, such as the earth, as shown at 12 in FIG. 2.

When the propagating medium increasingly attenuates the high frequencies (and this is true when elastic wave signals are propagated through the earth as in seismic exploration) then the relative amplitudes of the high and low frequencies in the received signal may be in ratios like 1 to 10 or even 1 to 100. In such cases the corresponding products obtained during the correlation process will be in the same ratio, and, accordingly, the high frequency components will have contributed very little to the sum obtained by the integration of these products. Therefore, the variations in the correlation values will be at a relatively slow rate since they will be determined largely by the lower frequencies. Stated in another way, the substantial increasing attenuation of the higher frequency components by the propagating medium is in effect substantially the same as a narrowing of the frequency spectrum of the transmitted sweep signal.

In the simple model above discussed in which there is no absorption (FIGS. 1 and 3) the relationship of the recorded data convolved with the geological medium can be expressed as follows:

$$d(t) = w(t)*s(t) + n(t) \tag{1}$$

wherein:
  d(t) = recorded data as a function of time
  w(t) = source signal as a function of time
  s(t) = reflection series as a function of time
  n(t) = noise as a function of time
  * = denotes convolution The crosscorrelation of such recorded data from equation (1) can be expressed in the time domain as:

$$\zeta wd(t) = w(-t)*d(t) \tag{2}$$

wherein:
  $\zeta wd(t)$ = crosscorrelation as a function of time of the source signal with the recorded data.

When converted to the frequency domain, the correlation of such data can be expressed as:

$$\Phi WD(f) = W(f)*D(f) \tag{3}$$

wherein:
  $\Phi WD(f)$ = crosscorrelation as a function of frequency of the source signal with the recorded data.
  W(f) = source signal as a function of frequency.
  D(f) = recorded data as a function of frequency then substituting from equation (1) (ignoring noise) in equation (3) for D(f) yields:

$$\Phi WD(f) = W(f)^* \cdot (f) \cdot S(f) \tag{4}$$

wherein:
  W(f)* = complex conjugate of W(f)

then substituting in equation (4):

$$\Phi WD(f) = \Phi ww(f) \cdot S(f) \tag{5}$$

METHOD OF COMPENSATING SEISMIC DATA FOR EFFECTS OF FREQUENCY DEPENDENT ATTENUATION

BACKGROUND OF THE INVENTION

This invention relates to the processing of seismic data and is particularly directed to the compensation of seismic data for the frequency dependent attenuation by the earth of propagated acoustic signals.

In utilizing the Vibroseis (a trademark of Continental Oil Company) seismic process, a seismic source signal is generated comprising an oscillatory, multi-frequency signal having predetermined starting and ending frequencies which are nonrepetitive over a preselected time period, and which is substantially longer than the travel time of such a signal as it is reflected from a subsurface geological strata to a seismic receiver on the earth's surface, such a signal to be hereinafter referred to as a "sweep" signal generated by a "vibrator source." Such a process is disclosed in U.S. Pat. Nos. 2,688,124 (Doty et al) and 2,989,726 (Crawford et al), and utilizes an oscillatory "sweep" signal as disclosed therein and which basic disclosure is incorporated by reference herein. As further used herein, the sweep signal generated by the vibrator source and coupled for transmission into the earth will be referred to as the "transmitted sweep" signal, and the sweep signal recorded as a counterpart to the transmitted sweep signal will be referred to as the "recorded sweep" signal.

The frequency dependent absorption of compressional waves in the earth is a known phenomenon quantitatively exhibited on seismic data obtained when making a Vibroseis survey. One method of correcting such data for the high frequency attenuation effects exhibited is disclosed in U.S. Pat. No. 2,808,577 (Crawford et al). The method disclosed therein is directed to a process for altering the effect of at least a portion of either the source "sweep" signal or the recorded propagated data signal upon the correlation values of such signals to counteract the effects on the correlation values which are due to the unequal attenuation by the propagating medium (the earth) of the high frequency components of the transmitted source signal. However, there is no disclosure or even suggestion of a technique for determination of accurate quantitative values of attenuation over the seismic source signal bandwidth nor how to quantitatively compensate for such attenuation.

Prior laboratory studies indicate frequency dependent absorption that is approximately linear at frequencies of 100 Hz and above. Hamilton, E. L., *Compressional Wave Attenuation in Maritime Sediments*, GEOPHYSICS, Vol. 37, pp. 620–646 (1972). Extrapolation to seismic bandwidth is uncertain but could be reasonably expected. Attewell, P. B., and Ramana, Y. V., *Wave Attenuation and Internal Friction as Functions of Frequency in Rocks*, GEOPHYSICS, Vol. 31, pp. 1049–1056 (1966). However, such studies have only measured or predicted the attenuation of compressional waves in certain sedimentary rocks, and such studies have not suggested any technique for accurately determining the attenuation function of received seismic data obtained as a result of using a Vibroseis sweep signal over the sweep signal bandwidth, nor any technique to quantitatively weight a Vibroseis sweep signal prior to correlation to compensate for such attenuation by the propagating medium.

Accordingly, one primary feature of the present invention is to provide a process for accurately determining the frequency dependent attenuation function exhibited by seismic data over the entire frequency range of the vibrator source signal.

Another feature of the present invention is to provide a process for accurately and quantitatively determining the compensation function to be applied to the source sweep signal prior to correlation with the received propagated data signals in order to compensate for the attenuation by the propagating medium.

Yet another feature of the present invention is to determine the discrete times for applying the derived compensation function to the source sweep correlation signal.

SUMMARY OF THE INVENTION

The present invention remedies the problems of the prior art by providing a quantitative process for compensating received propagated seismic signals for frequency dependent absorption by the earth. In accordance with one principle of this invention, a process for quantitative compensation of received propagated seismic signals for the absorption effect of the earth is disclosed wherein such signals have been generated by a vibrator source. The process comprises the steps of producing correlated data obtained by crosscorrelating the received propagated seismic signals with a recorded sweep signal; determining a Fourier amplitude spectrum for the correlated data; establishing a quantitative attenuation function from the Fourier amplitude spectrum for all frequencies contained in the recorded sweep signal; converting the attenuation function to an inverse amplitude function for compensation of the attenuation for all frequencies contained in the recorded sweep signal; applying the inverse amplitude function to the recorded sweep signal to obtain a weighted sweep signal for use in correlation; and producing attenuation compensated correlated data obtained by crosscorrelating the received propagated seismic signals with the weighted sweep signal.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the drawings:

FIG. 1 is a schematic representation of a conventional transmitted sweep signal generated by a mechanical vibrator source;

FIG. 2 is a schematic representation of the sweep signal shown in FIG. 1 which has been propagated through an attenuating geological medium which has increasingly attenuated the higher frequency components of the signal;

FIG. 3 is a schematic representation of an ideal correlation curve obtained when using a sweep signal as shown in FIG. 1 when there has been no attenuation on received seismic data by the geological medium;

FIG. 4 is a schematic representation of a correlation curve obtained when using a sweep signal as shown in FIG. 1 when there has been attenuation on received seismic data by the geological medium as shown in FIG. 2;

FIG. 5 is a representative example of a Fourier amplitude spectrum of received seismic data obtained using a transmitted sweep signal as shown in FIG. 1 which has been increasingly attenuated by the propagating geological medium at the higher frequencies as shown in FIG. 2 and correlated with the recorded sweep signal of FIG. 1, and includes a curve fitted to the average attenuation function exhibited by the data.

Figure 7:
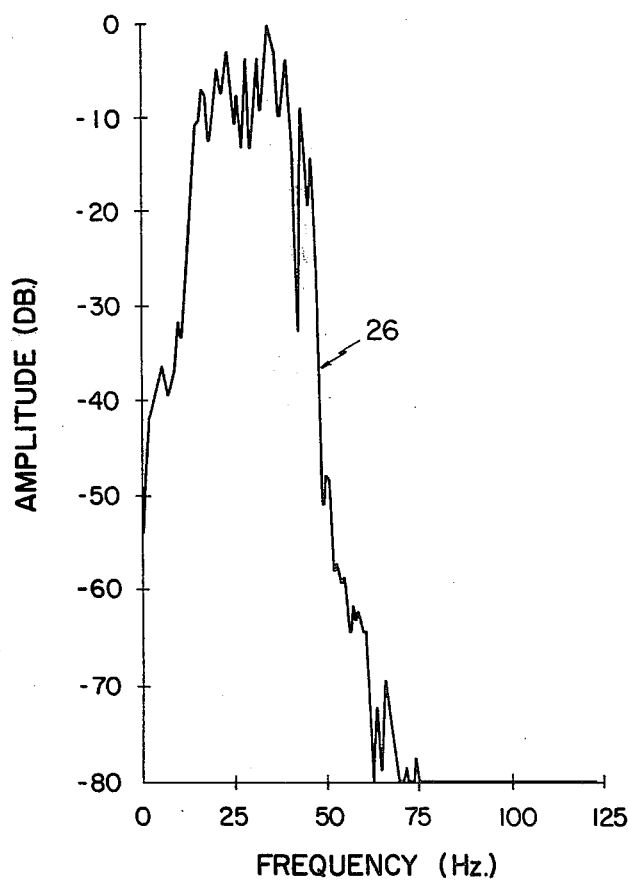
FIG. 7 is a representative example of a Fourier amplitude spectrum of received seismic data obtained using a transmitted sweep signal shown in FIG. 1 which has been attenuated by the propagating geological medium increasingly at the higher frequencies as shown in FIG. 2, but correlated with a weighted sweep signal.

FIG. 6 is an inverse amplitude (gain) function calculated for the attenuation function shown in FIG. 5;

FIG. 7 is a representative example of a Fourier amplitude spectrum of received seismic data obtained using a transmitted sweep signal shown in FIG. 1 which has been attenuated by the propagating geological medium increasingly at the higher frequencies as shown in FIG. 2, but correlated with a weighted sweep signal.

Figure 8:
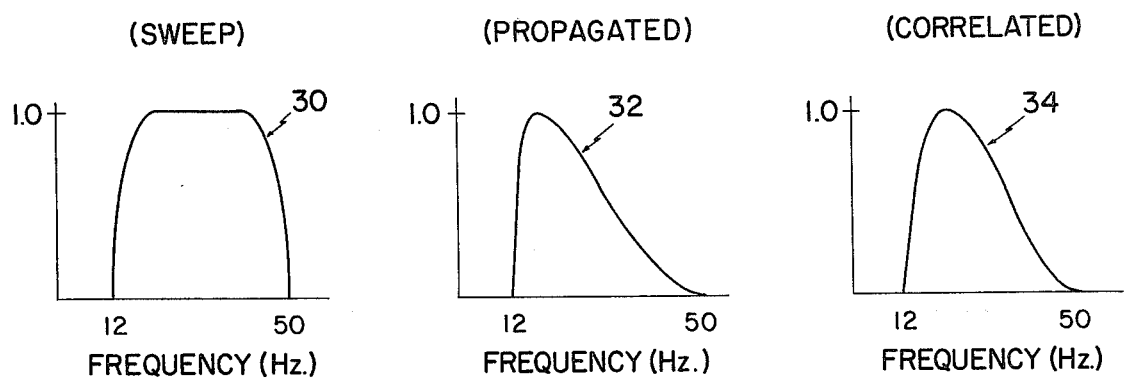
FIG. 8 is a schematic representation of smoothed Fourier amplitude spectra of the sweep signal, propagated signal, and correlated signal using an unweighted sweep signal as shown in FIG. 1.
Figure 9:
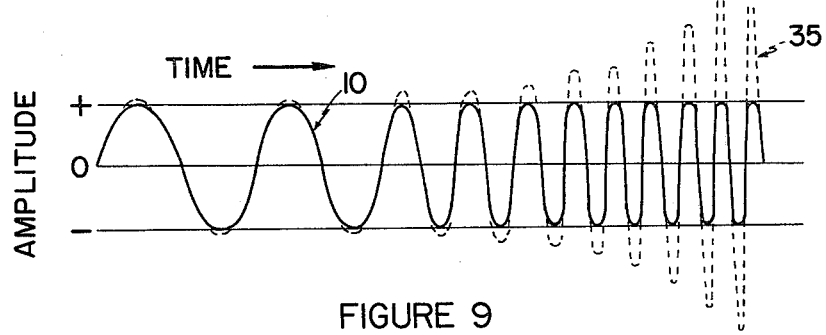
FIG. 9 is a schematic representation of the effect of applying a gain function to a recorded sweep signal prior to correlation.
Figure 10:
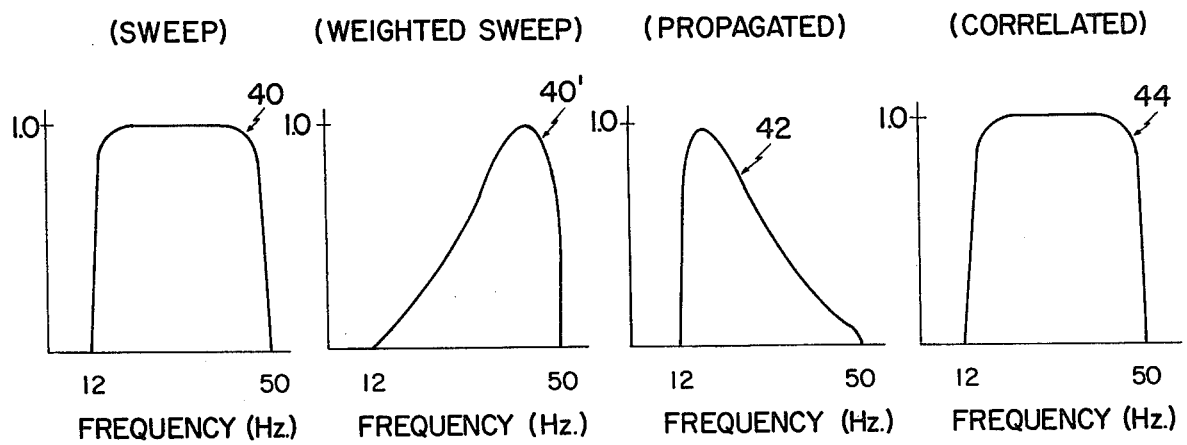
FIG. 10 is a schematic representation of smoothed Fourier amplitude spectra of the sweep signal, weighted sweep signal, propagated signal, and correlated signal using a weighted sweep signal as shown in FIG. 9.
Figure 11:
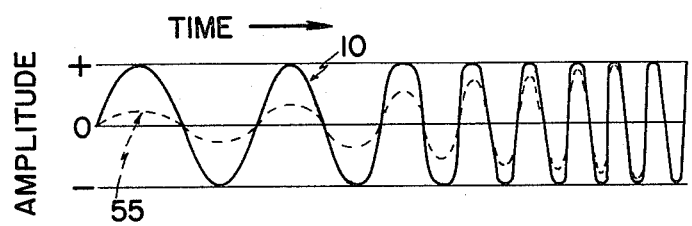
FIG. 11 is a schematic representation of the effect of applying another embodiment of an inverse amplitude function to a recorded sweep signal prior to correlation.
Figure 12:
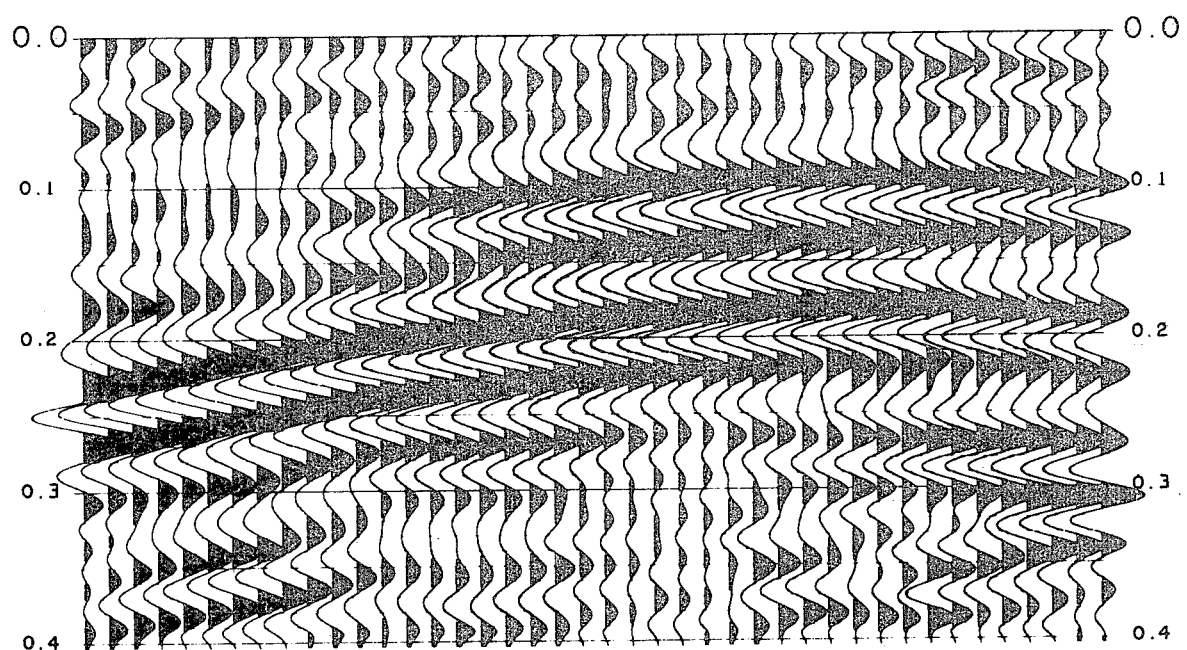
FIG. 12 is a representation of a portion of a conventional seismic record section wherein the propagated signal has been correlated with the original recorded sweep signal as shown in FIG. 8.
Figure 13:
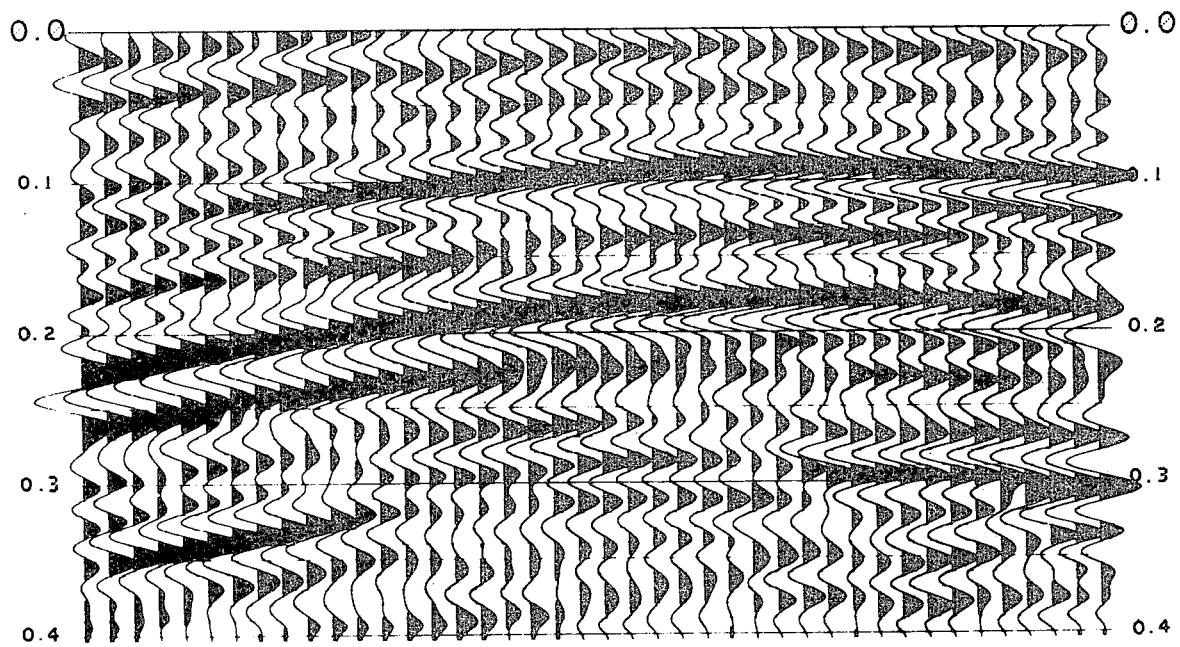
FIG. 13 is a representation of a portion of a seismic record section wherein, for the same seismic field data used to produce the seismic record of FIG. 12, the propagated signal has been correlated with the weighted sweep signal according to the present invention as shown in FIG. 10, with dramatically increased resolution.

FIG. 8 is a schematic representation of smoothed Fourier amplitude spectra of the sweep signal, propagated signal, and correlated signal using an unweighted sweep signal as shown in FIG. 1;

FIG. 9 is a schematic representation of the effect of applying a gain function to a recorded sweep signal prior to correlation;

FIG. 10 is a schematic representation of smoothed Fourier amplitude spectra of the sweep signal, weighted sweep signal, propagated signal, and correlated signal using a weighted sweep signal as shown in FIG. 9;

FIG. 11 is a schematic representation of the effect of applying another embodiment of an inverse amplitude function to a recorded sweep signal prior to correlation;

FIG. 12 is a representation of a portion of a conventional seismic record section wherein the propagated signal has been correlated with the original recorded sweep signal as shown in FIG. 8;

FIG. 13 is a representation of a portion of a seismic record section wherein, for the same seismic field data used to produce the seismic record of FIG. 12, the propagated signal has been correlated with the weighted sweep signal according to the present invention as shown in FIG. 10, with dramatically increased resolution.

DETAILED DESCRIPTION OF THE PREFERRED EMBODIMENTS

The present invention is a process for quantitatively compensating received propagated seismic signals for the frequency dependent absorption of the transmitted sweep signal when using a vibrator source signal as hereinabove described. Such a source or transmitted sweep signal is shown schematically in FIG. 1 as signal 10 and comprises an oscillatory, multifrequency source signal having predetermined starting and ending frequencies (generally in the range of 10–80 Hz) which are non-repetitive over a preselected time period (generally 15-20 seconds). However, in seismic surveying utilizing such a vibrator source signal, it is known that such compressional waves will exhibit an absorption phenomena in the earth that varies increasingly with frequency as shown in FIG. 2 at 12.

The correlation curve 14 illustrated in FIG. 3 is the theoretical curve derived by the correlation of a transmitted and recorded sweep signal, such as that shown at 10 in FIG. 1, with the same recorded signal after propagation through an ideal medium in which there is no attenuation. Thus, it is truly the autocorrelation curve of the transmitted sweep signal. The correlation curve 16 shown in FIG. 4 is the curve derived by the correlation of the transmitted and recorded sweep signal shown at 10 in FIG. 1, when the propagated signal has been increasingly attenuated at higher frequencies by the propagating medium, such as the earth, as shown at 12 in FIG. 2.

When the propagating medium increasingly attenuates the high frequencies (and this is true when elastic wave signals are propagated through the earth as in seismic exploration) then the relative amplitudes of the high and low frequencies in the received signal may be in ratios like 1 to 10 or even 1 to 100. In such cases the corresponding products obtained during the correlation process will be in the same ratio, and, accordingly, the high frequency components will have contributed very little to the sum obtained by the integration of these products. Therefore, the variations in the correlation values will be at a relatively slow rate since they will be determined largely by the lower frequencies. Stated in another way, the substantial increasing attenuation of the higher frequency components by the propagating medium is in effect substantially the same as a narrowing of the frequency spectrum of the transmitted sweep signal.

In the simple model above discussed in which there is no absorption (FIGS. 1 and 3) the relationship of the recorded data convolved with the geological medium can be expressed as follows:

$$d(t) = w(t)*s(t) + n(t) \qquad (1)$$

wherein:
 d(t) = recorded data as a function of time
 w(t) = source signal as a function of time
 s(t) = reflection series as a function of time
 n(t) = noise as a function of time
 * = denotes convolution The crosscorrelation of such recorded data from equation (1) can be expressed in the time domain as:

$$\zeta wd(t) = w(-t)*d(t) \qquad (2)$$

wherein:
 $\zeta wd(t)$ = crosscorrelation as a function of time of the source signal with the recorded data.

When converted to the frequency domain, the correlation of such data can be expressed as:

$$\Phi WD(f) = W(f)*D(f) \qquad (3)$$

wherein:
 $\Phi WD(f)$ = crosscorrelation as a function of frequency of the source signal with the recorded data.
 W(f) = source signal as a function of frequency.
 D(f) = recorded data as a function of frequency then substituting from equation (1) (ignoring noise) in equation (3) for D(f) yields:

$$\Phi WD(f) = W(f)* \cdot (f) \cdot S(f) \qquad (4)$$

wherein:
 W(f)* = complex conjugate of W(f)

then substituting in equation (4):

$$\Phi WD(f) = \Phi ww(f) \cdot S(f) \qquad (5)$$

wherein:

$\Phi ww(f)$ = autocorrelation as a function of frequency of the source signal.

Equation (5) provides a result that is a reflection series convolved with the autocorrelation of the source signal.

However, when attenuation by the earth is taken into account, the model becomes more complex (FIGS. 2 and 4), and the relationship of the recorded data convolved with the geological medium can be expressed by a change in equation (1) as follows:

$$d(t) = w'(t) * s(t) + n(t) \tag{6}$$

wherein:

$w'(t)$ = source signal as a function of time and altered by absorption.

The correlation of the attenuated recorded data obtained from equation (6), substituting in equation (4) yields:

$$\Phi WD(f) = W(f)^* \cdot W'(f) \cdot S(f) \tag{7}$$

Equation (7) will result in a correlation wavelet colored or altered by absorption.

The present invention provides a process for compensating received propagated seismic signals for the absorption of all frequencies of an oscillatory transmitted sweep signal in the earth by selectively compensating the recorded sweep signal over its entire frequency range prior to correlation with the received propagated (and attenuated) signals as hereinabove described.

FIG. 5 shows a Fourier amplitude spectrum 18 of typical received seismic data using a transmitted sweep signal shown in FIG. 1 and having a frequency range of 12 to 48 Hz. As can be seen from the plot, the attenuation of the received propagated signals increases over the entire frequency spectrum. The average attenuation function has been determined over the entire frequency range from 12 to 48 Hz and a curve 20 has been fitted to the exhibited attenuation function.

In the process according to this invention it is assumed that the absorption over the seismic bandwidth is slowly varying with frequency. This absorption or attenuation may be expressed as a low order polynomial function:

$$a(f) = C_0 + C_1 f + C_2 f^2 + C_3 f^3 \ldots C_n f^n \tag{8}$$

wherein:

a(f) = absorption as a function of frequency
f = frequency in Hz
$C_{0,1,2,3,n}$ = coefficients of absorption Of course, the coefficients could be varied with reflection time and spatially along the line of the seismic survey to accommodate variations in the earth's absorption. In addition, the absorption may be expressed as other mathematical functions, e.g., numerical series, etc., a choice of which depends on the absorption spectrum exhibited by the data.

The absorption curve 20 above discussed is considered as the low order polynominal component of the received propagated signal after correlation with the recorded sweep signal. In order to obtain statistical redundancy and to monitor temporal and spatial variations, a sufficient number of spectral analyses may be collected on correlated data at different time windows, and at different source-receiver separations and line locations along the seismic profile. A curve (such as curve 20) can be fitted to each of such spectra and a group average can be derived.

In the event such a plurality of Fourier spectral analyses collected on correlated data at different time windows and at different source-receiver separations and line locations along the seismic profile yields a group of curves (such as curve 20 shown in FIG. 5) that indicate a systematic variation of the attenuation function over the temporal and/or spatial dimensions of the seismic data, then the attenuation function can be adjusted in accordance with the values determined by the group of curves, and interpolated values can be determined at data points between the discrete curves. Accordingly, the temporal and spatial variations as herein described can be achieved with a minimum of at least two (2) derivation, control and application points, and progress through and inclusive of, if so desired, a continuous mode of derivation, control and application for every sample contained within the spatial and temporal boundaries of the recorded seismic data.

Accordingly, the attenuation function 20 (FIG. 5) can be expressed as a low order polynomial (or other mathematical function) curve as expressed in equation (8). The attenuation function is a spatial and temporal average derived from Fourier spectral analysis at specific points in space and time as dictated by representative geological data variations within the seismic data being analyzed as above-described. The attenuation function is obtained, as above described, by a curve 20 fit to the maxima and minima of the Fourier amplitude spectra at all frequencies of the recorded sweep signal as shown in FIG. 5.

An inverse absorption function can be derived from the attenuation function and applied as a continuously changing function, changing spatially, with time and with frequency.

If the absorption function 20 of FIG. 5 is applied to the transmitted sweep signal as the product of the transmitted sweep signal and the absorption values, then:

$$W'(f) = W(f) \cdot A(f) \tag{9}$$

wherein:

W'(f) = altered transmitted sweep signal
W(f) = original transmitted sweep signal
A(f) = absorption function The altered transmitted sweep signal of equation (9) would be ideally shown as a curve 12 such as that shown in FIG. 2.

The original transmitted sweep signal (FIG. 1) may be obtained from the altered sweep signal (FIG. 2) by inverse weighting of the values in equation (9):

$$W(f) = W'(f) \cdot A^{-1}(f) \tag{10}$$

The inverse absorption function must be related to the sweep signal via the definition of the sweep signal. For instance:

$$f(t) = f_o + kt \tag{11}$$

and $$k = (f_e - f_o)/L \tag{12}$$

wherein:

f(t) = sweep signal as a function of time
$f_o$ = sweep signal starting frequency $f_e$ = sweep signal ending frequency
$L$ = sweep signal duration (seconds)
$K$ = a constant
The time at which to apply $A^{-1}(f)$ is given by:

$$t = (f - f_o)/k \qquad (13)$$

wherein:
$f$ = sweep signal frequency of interest
Assuming a sweep signal wherein:
  $f_o$ = 12 Hz
  $f_e$ = 48 Hz
  $L$ = 9 seconds
then substituting in equations (12) and (13) above gives:

$$f(t) = 12 + 4t$$

and $$t = (f - 12)/4$$

Accordingly, the average attenuation curve 20 (FIG. 5) can be expressed in values given in the following table:

TABLE 1

| Hz | A (db) | Time (sec.) | Gain (%) |
|---|---|---|---|
| 12 | −0.0 | 0.00 | 100 |
| 20 | −5.5 | 2.0 | 189 |
| 25 | −9.0 | 3.25 | 282 |
| 30 | −12.0 | 4.5 | 398 |
| 35 | −15.0 | 5.75 | 562 |
| 40 | −18.0 | 7.0 | 794 |
| 45 | −21.0 | 8.25 | 1122 |
| 48 | −23.5 | 9.0 | 1499 |

Although the absorption is actually suffered by the recorded propagated data and not by the sweep signal, the correction in equation (10) is a convolution, and may be applied in any step in the process. The most economical application is to apply the correction to the recorded sweep signal prior to correlation. To gain the sweep signal results in:

$$WG(f) = A^{-1}(f) \cdot W(f) \qquad (14)$$

wherein:
$WG(f)$ = gained recorded sweep signal

The necessary gain G to be used in equation (14) can be derived from the inverse of the derived attenuation curve (FIG. 5 and Table 1) to produce a gain function 24 (Table 1) as shown in FIG. 6 which can be applied, at the times reflected in Table 1, to the recorded sweep signal to produce a gained sweep signal prior to correlation. Note that the compensation curve also varies slowly with frequency.

The received propagated data is the convolution of the transmitted sweep signal, the absorption, and the reflectivity series with noise added as shown by the following equation.

$$D(f) = W(f) \cdot A(f) \cdot S(f) + N(f) \qquad (15)$$

wherein:
$D(f)$ = received data
$W(f)$ = source signal
$A(f)$ = absorption
$S(f)$ = reflectivity series
$N(f)$ = noise Correlation of the received data with the gained sweep signal is given by the following equation:

$$WG^*(f) \cdot D(f) = A^{-1}(f) \cdot W^*(f) \cdot W(f) \cdot A(f) \cdot S(f) + N(-f) \cdot WG^*(f) \qquad (16)$$

The noise reflected in the last term of equation (16) is dispersed and ignored in the following equation:

$$WG^*(f) \cdot D(f) = \Phi_{ww}(f) \cdot S(f) \qquad (17)$$

wherein:
$WG^*(f)$ = complex conjugate of $WG(f)$
$W(f)$ = original transmitted sweep signal
$W(f)^*$ = complex conjugate of the original transmitted sweep signal
$N(f)$ = random noise not excited by the sweep source
$\Phi_{ww}(f)$ = autocorrelation of the sweep signal With the gained recorded sweep signal correlated with the original recorded propagated data, which was the same seismic data used to obtain the curve shown in FIG. 5, a new Fourier amplitude spectrum (using the altered sweep signal) can be obtained and would appear as curve 26 in FIG. 7. Note the elimination of the severe attenuation of the higher frequencies above 35 Hz as contrasted with the attenuation exhibited in FIG. 5.

The above differences in the Fourier amplitude spectra for the correlated data using an unweighted and weighted source signal in correlation are shown in simplified amplitude spectra in FIGS. 8 and 10. In FIG. 8 the spectra of an unweighted sweep signal 30 is shown with the spectra of the received propagated signal 32 and the resultant spectra of the correlated signal 34. Note that the correlation spectra of FIG. 8 is a smoothed, simplified, schematic representation of an actual correlation spectra such as that shown in FIGS. 5 and 7.

However, if a recorded sweep signal 10 is altered by applying an inverse absorption function, such as the gain function of FIG. 6, the "weighted" sweep signal would appear as signal 35 shown in dotted lines in FIG. 9.

If the sweep signal has been weighted as in FIG. 9, then the Fourier amplitude spectra of the weighted recorded sweep signal 40' is shown with the spectra of the transmitted sweep signal 40, the received propagated signal 42 and the correlation value 44 will be as shown in FIG. 10. As can be seen from FIG. 10, the use of the weighted recorded sweep signal yields a correlated signal 44 with less attenuation, similar to the actual spectra shown in FIG. 7.

FIG. 11 represents another embodiment of this invention wherein the inverse absorption (amplitude) function is applied to reverse attenuate the recorded sweep signal 10 as shown by the dotted lines at 55. In this embodiment of the process, the attenuation function as shown at 20 in FIG. 5 is obtained, but the absorption (amplitude) function is applied to reverse attenuate the recorded sweep signal 10 over its entire bandwidth with the attenuation value being the highest at the lowest frequency and varying continuously over the bandwidth to its lowest value at the highest frequency. In this technique, the portion of the sweep signal that is ordinarily least attenuated by the propagating medium is attenuated the greatest. The smoothed Fourier amplitude spectra using the inverse amplitude function applied to the recorded sweep signal will produce a series as shown in FIG. 10 above, with the resulting correlated spectra 44. However, the amplitude of the correlated spectra 44 would be scaled down in the range of 1 to 10 or 1 to 100. The correlated values could, using conventional data processing techniques, then be scaled up when displayed on a seismic record to show greater detail and resolution.

A portion of a seismic record is shown in FIG. 12 where the data shown in the record has been correlated with the original unweighted recorded sweep signal which is conventional practice in the industry. However, the portion of a seismic record shown in FIG. 13 illustrates the dramatically improved resolution that can be achieved by using the process for absorption compensation according to this invention, when the process is applied to the same seismic field data as used to prepare the record shown in FIG. 12.

Numerous variations and modifications may be made in the structure herein described without departing from the present invention. Accordingly, it should be clearly understood that the forms of the invention herein described and shown in the figures of the accompanying drawings are illustrative only and are not intended to limit the scope of the invention.

What is claimed is:

1. A process for compensating received propagated seismic signals for frequency dependent absorption in the earth, wherein such signals have been generated by a vibrator source and propagated in the earth as a transmitted sweep signal, and wherein a recorded sweep signal has been recorded as a counterpart to the transmitted sweep signal, comprising the steps of producing correlated data obtained by crosscorrelating said received propagated seismic signals with said recorded sweep signal, determining a plurality of Fourier amplitude spectra for said correlated data, establishing an average quantitative amplitude attenuation function from said Fourier amplitude spectra for all frequencies contained in the recorded sweep signal, converting said amplitude attenuation function to an inverse amplitude function for compensation of the attenuation for all frequencies contained in the recorded sweep signal, applying said inverse amplitude function to the recorded sweep signal to obtain a weighted sweep signal for use in correlation, and producing attenuation compensated correlated data obtained by crosscorrelating said received propagated seismic signals with said weighted sweep signal.

2. The process as described in claim 1, wherein said establishing step comprises fitting a curve to the maxima and minima of each of said Fourier amplitude spectra at all frequencies of the recorded sweep signal, each of said curves varying slowly with frequency, and averaging said attenuation function values obtained from said plurality of curves to establish an average quantitative function.

3. The process as described in claim 1, wherein each of said plurality of Fourier amplitude spectra is representative of said correlated data at selected spatial and temporal points in said data, and wherein said establishing step comprises fitting a curve to the maxima and minima of each of said Fourier amplitude spectra at all frequencies of the recorded sweep signal, each of said curves varying slowly with frequency, determining a systematic variation of said curves over said spatial and temporal points selected in said data, establishing a quantitative attenuation function for each of said curves over said spatial and temporal points selected in said data, and establishing resultant attenuation function values obtained from the attenuation function value of each of said curves over said spatial and temporal points selected in said data and by interpolating attenuation function values from said curves for spatial and temporal points in said data other than at said selected data points.

4. The process as described in claim 1, wherein said converting step comprises converting said established attenuation function values to an inverse amplitude gain function for all frequencies of said recorded sweep signal, said gain function continuously varying with the frequency of the recorded sweep signal.

5. The process as described in claim 1, wherein said converting step comprises converting said established attenuation function values to an inverse amplitude attenuation function for all frequencies of said recorded sweep signal, said attenuation function continuously varying with the frequency of the recorded sweep signal.

6. The process as described in claim 1, wherein said converting step further includes the step of determining the record time at which to apply said inverse amplitude function with relation to the beginning of said recorded sweep signal.

7. A process for compensating received propagated seismic signals for frequency dependent absorption in the earth, wherein such signals have been generated by a vibrator source and propagated in the earth as a transmitted sweep signal, and wherein a recorded sweep signal has been recorded as a counterpart to the transmitted sweep signal, comprising the steps of producing correlated data obtained by crosscorrelating said received propagated seismic signals with said recorded sweep signal, determining a plurality of Fourier amplitude spectra for said correlated data, fitting a curve to the maxima and minima of each of said fourier amplitude spectra at all frequencies of the recorded sweep signal, each of said curves varying slowly with frequency, averaging the attenuation function values obtained from said plurality of curves to establish an average quantitative attenuation function for all frequencies contained in the recorded sweep signal, converting said attenuation function to an inverse amplitude function for compensation of the attenuation for all frequencies contained in the recorded sweep signal, applying said inverse amplitude function to the recorded sweep signal to obtain a weighted sweep signal for use in correlation, and producing attenuation compensated correlated data obtained by crosscorrelating said received propagated seismic signals with said weighted sweep signal.

8. The process as described in claim 7, wherein each of said plurality of Fourier amplitude spectra is representative of said correlated data at selected spatial and temporal points in said data, and wherein said fitting and averaging steps comprise
- fitting a curve to the maxima and minima of each of said Fourier amplitude spectra at all frequencies of the recorded sweep signal, each of said curves varying slowly with frequency,
- determining a systematic variation of said curves over said spatial and temporal points selected in said data,
- establishing a quantitative attenuation function for each of said curves over said spatial and temporal points selected in said data, and
- establishing resultant attenuation function values obtained from the attenuation function value of each of said curves over said spatial and temporal points selected in said data and by interpolating attenuation function values from said curves for spatial and temporal points in said data other than at said selected data points.

9. The process as described in claim 7, wherein said converting step comprises converting said established attenuation function values to an inverse amplitude gain function for all frequencies of said recorded sweep signal, said gain function continuously varying with the frequency of the recorded sweep signal.

10. The process as described in claim 7, wherein said converting step comprises converting said established attenuation function values to an inverse amplitude attenuation function for all frequencies of said recorded sweep signal, said attenuation function continuously varying with the frequency of the recorded sweep signal.

11. The process as described in claim 7, wherein said converting step further includes the step of determining the record time at which to apply said inverse amplitude function with relation to the beginning of said recorded sweep signal.

* * * * *